United States Patent [19]

Haraikawa et al.

[11] 4,284,176
[45] Aug. 18, 1981

[54] MECHANICALLY OPERATED DISC BRAKE

[75] Inventors: Tetsuo Haraikawa, Funabashi; Koichi Tamura, Tokyo, both of Japan

[73] Assignee: Tokico Ltd., Kawasaki, Japan

[21] Appl. No.: 68,106

[22] Filed: Aug. 20, 1979

[30] Foreign Application Priority Data

Aug. 19, 1978 [JP] Japan ................................ 53-101130
Aug. 19, 1978 [JP] Japan ................................ 53-101132

[51] Int. Cl.³ ............................................. F16D 65/38
[52] U.S. Cl. ................................. 188/71.7; 188/72.3; 188/72.7; 188/196 M
[58] Field of Search ................... 188/71.7, 72.3, 72.7, 188/72.8, 72.9, 196 M, 196 V

[56] References Cited
U.S. PATENT DOCUMENTS 4,088,204  5/1978  Haraikawa ...................... 188/72.7 X
4,162,720  7/1979  Haraikawa ...................... 188/72.7 X Primary Examiner—Douglas C. Butler
Attorney, Agent, or Firm—Wenderoth, Lind & Ponack

[57] ABSTRACT

A mechanically operated disc brake of the type including a caliper slidably supported in the axial direction of a disc and straddling a peripheral portion of the disc, a pair of friction pads one of which is urged against the disc by a limb of the caliper, a cavity formed in another limb of the caliper, a nut member mounted in the cavity and being adapted to receive a rotational input force, a converting mechanism received in the cavity for converting the rotational movement of the nut member into axial movement thereof, a rod member screw-threadingly engaging with the nut member with the inner end abutting with the other friction pad for urging the same against the disc, and a rotation control member for controlling rotation of the nut member. The cavity of the caliper has an inner cavity receiving therein the nut member and the converting mechanism, and an outer cavity partitioned from the inner cavity by an annular wall and receiving therein the rotation control member and a return spring which acts on the outer end of the rod member for biassing the rod member outwardly.

8 Claims, 9 Drawing Figures

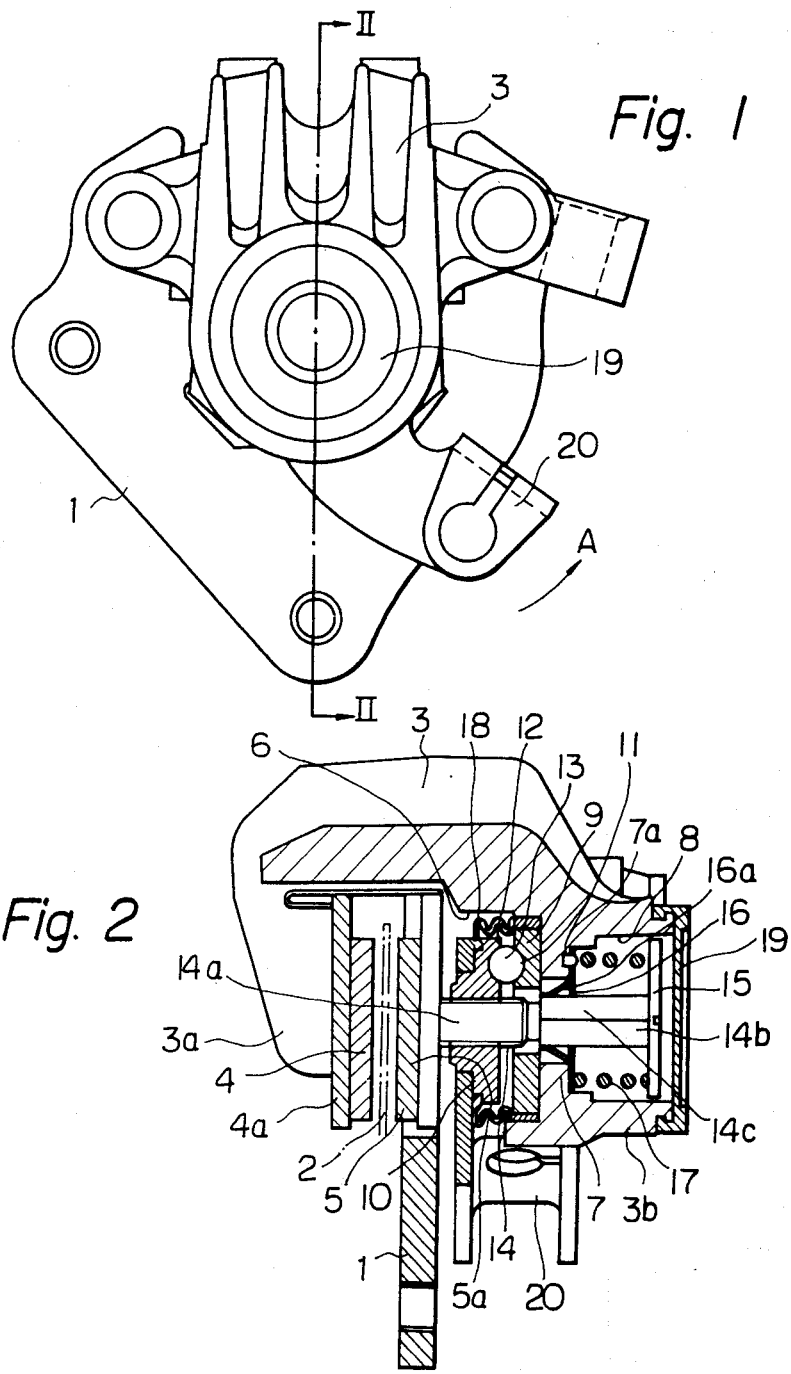

MECHANICALLY OPERATED DISC BRAKE

BACKGROUND OF THE INVENTION

This invention relates to mechanically operated disc brakes, and more particularly to improvements in such disc brakes wherein the position of a friction pad can easily be adjusted when the friction pad has worn.

Conventional mechanically operated disc brakes receive the input force in a rotational direction which is applied through a cable or the like associated with a brake pedal or a brake lever and convert the rotational input force into a linear output force thereby effecting the braking action. For converting the force in a rotational direction into the force of the linear direction there are usually provided a nut member for receiving the rotational input force, and cooperating ramp surfaces, preferably having a ball therebetween, formed respectively on the nut member and a ramp member, whereby the rotational movement of the nut member is converted into the linear movement. Further, an adjusting rod threadingly engages the nut member and abuts with one of friction pads for transmitting a thrust force from the nut member to the friction pad thereby applying the same against one surface of a disc. When the friction pad has worn, the adjusting rod is rotated relative to the nut member to compensate for the wear of the friction pad. For preventing incidental rotation of the rod member, there has usually been provided a rotation control member. However, the rotation control members of prior art disc brakes have a complex construction and are troublesome to assemble and maintain.

SUMMARY OF THE INVENTION

It is accordingly an object of the invention to provide a disc brake which overcomes the aforesaid problems.

According to the invention, there is provided a mechanically operated disc brake of the kind including a caliper slidably supported in the axial direction of a disc and straddling a peripheral portion of the disc and having limbs which extend respectively along opposite sides of the disc, a first friction pad urged against one surface of the disc by one of the limbs of the caliper, a second friction pad disposed opposite the first friction pad with the disc therebetween, a cavity formed in the other limb of the caliper, a nut member mounted in the cavity of the caliper and adapted to receive a rotational input force, a mechanism for converting rotational movement of the nut member into axial movement thereof, and a rod member threadingly engaging the nut member with the inner end abutting the second friction pad for urging the same against the other surface of the disc; wherein, the cavity in the caliper comprises an inner cavity receiving therein the nut member and the converting mechanism, and an outer cavity partitioned from the inner cavity by an annular wall; and the outer end of the rod member extends into the outer cavity and has mounted thereon a spring retainer which receives the spring force of a return spring disposed between the spring retainer and the annular wall; and a rotation control member is disposed contiguous to the annular wall with a leg portion thereof engaging with the outer periphery of a portion of the rod member to restrict the rotation thereof.

BRIEF DESCRIPTION OF THE DRAWINGS

These and other features of the invention will be clear from a reading of the following specification in conjunction with the accompanying drawings which show several embodiments and in which:

FIG. 1 is a front view of an embodiment of the disc brake according to the invention;

FIG. 2 is a cross-sectional view taken along the line II—II of FIG. 1;

DETAILED DESCRIPTION OF THE PREFERRED EMBODIMENTS

Figure 3:
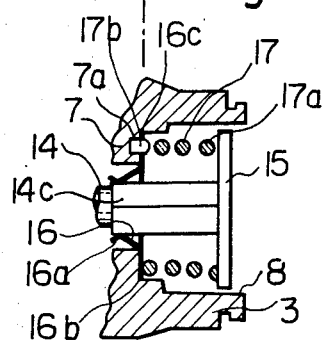
FIG. 3 is a partial view showing a portion of FIG. 2.

Referring now to FIGS. 1 to 4, there is shown at 1 a supporting member secured to a non-rotatable part of a vehicle. Slidably supported on the supporting member 1 for movement parallel to the direction of the axis of a rotatable disc 2 is a caliper 3 which straddles a portion of the periphery of the disc 2 and has limbs 3a and 3b extending generally along respective sides of the disc 2. The limb 3a supports the rear side of a backing plate 4a of a first friction pad 4 which is disposed on one side of the disc 2. A second friction pad 5 opposed to the first friction pad is slidably supported for movement parallel to the direction of the axis of the disc 2 on the supporting member 1. There is formed in the other limb 3b of the caliper 3 an annular recess or cavity 6 at a position opposite to the friction pad 5, and the cavity 6 communicates through an annular wall 7 with an annular recess or cavity 8 which opens from the limb in the outward direction. A hole 7a is formed in the wall 7 and opens toward the cavity 8.

A ramp plate 9 is disposed in the cavity 6 and is secured to the wall 7, and a nut member 10 having an operating lever 20 secured thereto is disposed opposite to the ramp plate 9. In the opposing surfaces of the ramp plate 9 and the nut member 10, there are formed inclined grooves 11 and 12 respectively the depth of which changes gradually in the circumferential direction. A ball 3 engages in grooves 11 and 12, whereby, when the nut member 10 is rotated relative to the ramp plate 9 the ball 13 rotates along the inclined surfaces of grooves 11 and 12 thus changing the axial distance between the ramp plate 9 and the nut member 10. A rod member 14 is threadingly engaged in the nut member 10, and one end, i.e. the inner end, 14a of the rod member 14 abuts with a backing plate 5a of the friction pad 5, and the other end, i.e. the outer end, 14b thereof extends through the ramp plate 9 and the wall 7 into the cavity 8 and has a spring retainer 15 secured thereto.

Figure 4:
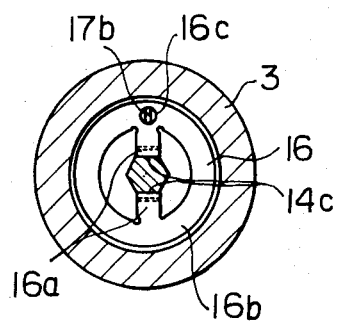
FIG. 4 is a cross-sectional view taken along the line IV—IV of FIG. 3.

The rod member 14 has a hexagonal cross-section at the outer end 14b, and tow diametrically opposite flat surfaces 14c of the hexagon engage with leg portions 16a of a rotation control member 16. The rotation control member 16 is a plate like member with an annular peripheral portion 16b supported on annular wall surface of the wall 7 and the leg portions 16a extend radially inwardly as shown in FIGS. 3 and 4. A coil spring 17 is disposed in the cavity 8 with one end 17a urging the retainer 15 in the outward direction or rightward as viewed in FIG. 3. The other end 17b of the spring 17 extends through a hole 16c in the rotation control member 16 and is inserted into the hole 7a of the wall 7. Thus, the spring 17 acts to locate the rotation control member 16 and also prevents the rotation thereof. The spring 17 also acts through the rod member 14 on the nut member 10 urging it toward the ramp plate 9 thus maintaining the grooves 11 and 12 and the ball 13 in the engaged condition and also positively retracting the rod member 14 and the nut member 10 when the braking action is released. Illustrated at 18 is a dust cover and at 19 a cover closing the cavity 8.

In operation, the operating lever 20 is rotated by a cable or the like (not shown) connected to a brake pedal or a brake lever (not shown) in the direction of arrow A as viewed in FIG. 1, the nut member 10 rotates and displaces toward the friction pad 5 with respect to the ramp plate 9, whereby the rod member 14 urges the friction pad 5 against the disc 2 and the reaction force displaces the caliper 3 in the opposite direction, whereby the friction pad 4 is urged against the disc 2 by the limb 3a of the caliper 3.

When the force acting on the operating lever 20 is released, the spring 17 pulls the rod member 14 and the nut member 10 back to the inactive position whereby the operating lever 20 rotates to the initial position, and the friction pads 4 and 5 separate from the disc 2. It will be noted that in the initial stage of the brake application the nut member 10 may rotate with respect to the rod member 14 some amount, but both members 10 and 14 rotate together when a substantial amount of force is transmitted therebetween although the amount of rotation thereof is sufficiently small such that the leg portions 16a of the rotation control member 16 do not ride over the corners of the opposing flat surfaces 14c of the rod member 14. The rotation control member 16 is retained by the end 17b of the spring 17, so that incidental rotation of the rod member 14 with respect to the nut member 10 is reliably prevented, and the rod member 14 returns to the original angular position when the brake is released.

In case the amount of wear in friction pads 4 and 5 is other great, the cover 19 is removed and the rod member 14 is rotated manually so as to move the friction pads 4 and 5 toward the disc 2.

Figure 5:
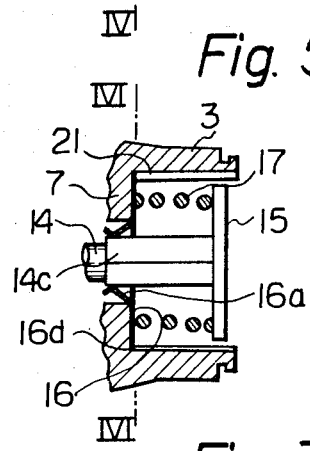
FIG. 5 is a view similar to FIG. 3 but showing a modified form of the rotation control member.
Figure 6:
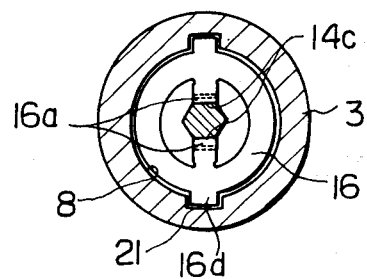
FIG. 6 is a cross-sectional view taken along the line VI—VI of FIG. 5.

FIGS. 5 and 6 show a modified form, wherein axially extending grooves 21 are formed in the inner peripheral wall of the cavity 8, and projecting portions 16d are formed on the outer periphery of the rotation control member 16 for engaging with the grooves 21 thereby preventing the rotation of the rotation control member 16 with respect to the caliper 3.

Figure 7:
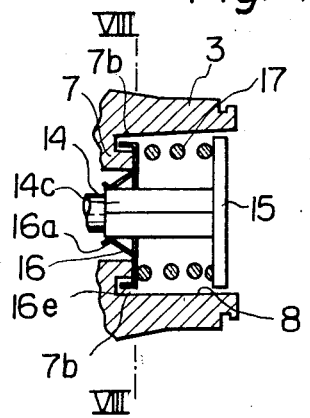
FIG. 7 is a view similar to FIG. 3, but showing a further modified form of the rotation control member.
Figure 8:
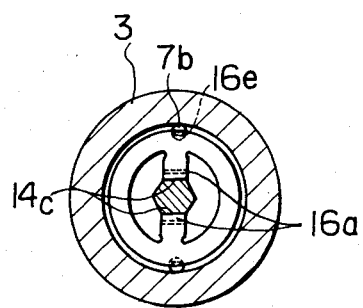
FIG. 8 is a cross-sectional view taken along the line VIII—VIII of FIG. 7.

FIGS. 7 and 8 show a further modified form wherein projecting portions 16e formed on the outer periphery of the rotation control member are bent to extend in the axial direction and are fitted respectively in holes 7e which are formed in the wall 7.

As described heretofore, the rotation control member 16 according to the invention is mounted on the caliper in a simple manner without utilizing fasteners or the like, and thus the number of parts can be reduced and the assembling and maintenance operations can easily be performed. Further, the spring 17 acting as a return spring is incorporated in the caliper, so that it is possible to omit a return spring such as has been installed separately from the disc brake in prior art disc brake.

Figure 9:
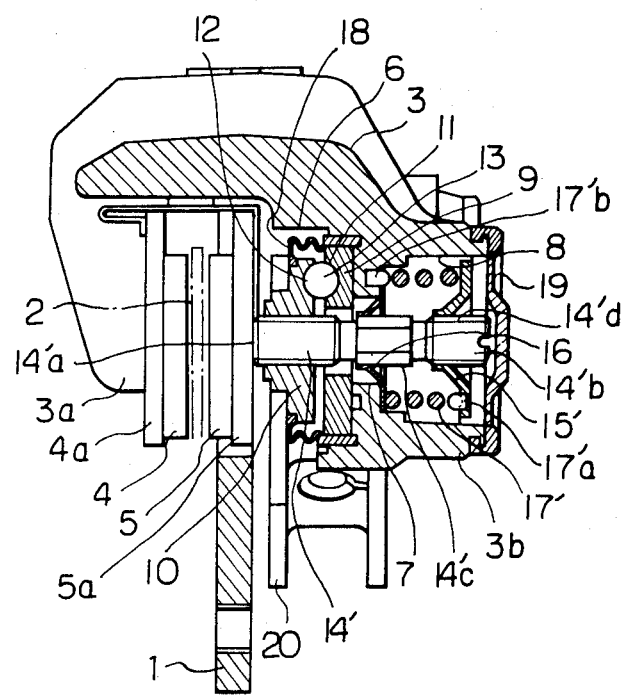
FIG. 9 is a cross-sectional view similar to FIG. 2 but showing another embodiment of the invention.

In the embodiment illustrated in FIG. 2 the rod member 14 is rotated with respect to the nut member 10 when wear in the friction pads 4 and 5 increases, and accordingly the length of the spring 17 will decrease in response to the adjustment, so that there is the shortcoming that the spring force of the spring 17 will increase. The embodiment shown in FIG. 9 overcomes this shortcoming. In FIG. 9, screw-threads 14'd are formed on the outer end portion 14'b of the rod member 14' and threadingly engage with a spring retainer 15'. Thus, when the rod member 14' is rotated relative to the nut member 10 for effecting the adjustment of the brake clearance, the rod member 14' can also be rotated with respect to the retainer 15' so as to maintain the distance between the retainer 15' and the nut member 10 constant, thereby maintaining the spring force in the inactuated condition of the disc brake constant. The rotation of the rotation control member 16 is prevented by means similar to the first embodiment, and a further description thereof is omitted. In this embodiment, the outer end 17'a of the spring 17' engages in a hole formed in the retainer 15' so as to prevent the rotation of the retainer 15'.

What is claimed is:

1. A mechanically operated disc brake comprising:
   a supporting member;
   a caliper slidably supported on said supporting member for sliding movement parallel to the axial direction of a disc to be braked and straddling a peripheral portion of the disc and having limbs extending along opposite sides of the disc;
   a first friction pad engaged by one of said limbs for being urged against one surface of the disc by said one limb;
   a second friction pad opposed to the first friction pad on the other side of the disc;
   the other limb of said caliper having a cavity therein, said cavity having an inner cavity facing toward said friction pads and an outer cavity facing away from said friction pads and an annular wall having an aperture therethrough partitioning the outer cavity from the inner cavity;
   a nut member rotatably mounted in the inner cavity and having means for applying thereto a rotational input force;
   means in said inner cavity engaged with said nut member for converting rotational movement of the nut member into axial movement thereof;
   a rod member on which said nut member is threaded and having an inner end abutting the second friction pad for urging said second friction pad against the disc and an outer end extending through the opening in said annular wall into said outer cavity;
   a spring retainer on said outer end of said rod member;
   a spring extending between said annular wall and said spring retainer; and
   a rotation control member fixed in said outer cavity contiguous to said annular wall and non-rotatably fixed therein and having at least one leg portion engaging the outer peripheral surface of said rod member for restricting the rotation thereof.

2. A mechanically operated disc brake as claimed in claim 1 in which said leg portion extends into said opening in said annular wall.

3. A mechanically operated disc brake as claimed in claim 1 wherein said rotation control member has a hole therein and said annular wall has a hole therein opening into said outer cavity, and one end of said spring extends through said hole in said rotation control member and into said hole in said annular wall, thereby preventing rotation of the rotation control member with respect to the annular wall.

4. A mechanically operated disc brake as claimed in claim 1 wherein the peripheral wall of the outer cavity has an axially extending groove therein and said rotation control member has a radial projection on the outer circumference thereof engaged in said groove for non-rotatably fixing said rotation control member.

5. A mechanically operated disc brake as claimed in claim 1 wherein a portion of the rotation control member is bent in a direction parallel to said rod member and said annular wall has a hole therein opening into said outer cavity into which said bent portion extends for non-rotatably fixing said rotation control member.

6. A mechanically operated disc brake as claimed in claim 1 wherein said spring retainer is axially displaceably mounted on said rod member.

7. A mechanically operated disc brake as claimed in claim 6 wherein said spring retainer is screw-threadly mounted on said rod member.

8. A mechanically operated disc brake as claimed in claim 7 wherein said annular wall has a hole therein opening into said outer cavity and said rotation control member has a hole therein and said spring retainer has a hole therein, one end of said spring being inserted into said hole in said annular wall through the hole in said rotation control member and the other end of said spring being inserted into said hole in said spring retainer, whereby said rotation control member and said spring are prevented from rotation in said outer cavity.

* * * * *